United States Patent
Jung et al.

(10) Patent No.: US 12,080,886 B2
(45) Date of Patent: Sep. 3, 2024

(54) METHOD OF WASHING POSITIVE ELECTRODE ACTIVE MATERIAL, AND POSITIVE ELECTRODE ACTIVE MATERIAL PREPARED THEREBY

(71) Applicant: LG Chem, Ltd., Seoul (KR)

(72) Inventors: Won Sig Jung, Daejeon (KR); Sang Soon Choi, Daejeon (KR); Hyun Ah Park, Daejeon (KR)

(73) Assignee: LG Chem, Ltd., Seoul (KR)

( * ) Notice: Subject to any disclaimer, the term of this patent is extended or adjusted under 35 U.S.C. 154(b) by 973 days.

(21) Appl. No.: 17/050,919

(22) PCT Filed: May 7, 2019

(86) PCT No.: PCT/KR2019/005428
§ 371 (c)(1),
(2) Date: Oct. 27, 2020

(87) PCT Pub. No.: WO2019/212321
PCT Pub. Date: Nov. 7, 2019

(65) Prior Publication Data
US 2021/0234164 A1    Jul. 29, 2021

(30) Foreign Application Priority Data

May 4, 2018   (KR) .................. 10-2018-0051714

(51) Int. Cl.
| | |
|---|---|
| H01M 4/525 | (2010.01) |
| B08B 3/08 | (2006.01) |
| C01G 53/00 | (2006.01) |
| H01M 4/02 | (2006.01) |
| H01M 4/36 | (2006.01) |
| H01M 4/505 | (2010.01) |
| H01M 10/0525 | (2010.01) |

(52) U.S. Cl.
CPC .............. H01M 4/525 (2013.01); B08B 3/08 (2013.01); C01G 53/50 (2013.01); H01M 4/366 (2013.01); H01M 4/505 (2013.01); H01M 10/0525 (2013.01); *C01P 2004/80* (2013.01); *C01P 2006/40* (2013.01); *H01M 2004/028* (2013.01)

(58) Field of Classification Search
None
See application file for complete search history.

(56) References Cited

U.S. PATENT DOCUMENTS

| | | | |
|---|---|---|---|
| 2010/0193365 A1* | 8/2010 | Lopatin ................. | H01M 4/661 |
| | | | 204/203 |
| 2012/0292561 A1 | 11/2012 | Sasaoka et al. | |
| 2014/0087262 A1 | 3/2014 | Imahashi et al. | |
| 2015/0104708 A1* | 4/2015 | Bi ......................... | H01M 4/525 |
| | | | 264/618 |
| 2015/0221940 A1 | 8/2015 | Shimonishi et al. | |
| 2016/0197340 A1* | 7/2016 | Lee ........................ | H01M 4/48 |
| | | | 429/223 |
| 2017/0012286 A1 | 1/2017 | Washida et al. | |
| 2017/0352885 A1 | 12/2017 | Kondo et al. | |

FOREIGN PATENT DOCUMENTS

| | | |
|---|---|---|
| CN | 102754253 A | 10/2012 |
| CN | 102881911 A | 1/2013 |
| CN | 103123968 A | 5/2013 |
| CN | 105280885 A | 1/2016 |
| CN | 105374992 A | 3/2016 |
| JP | 2012230898 A | 11/2012 |
| JP | 2015144105 A | 8/2015 |
| KR | 20120117822 A | 10/2012 |
| KR | 20140081663 A | 7/2014 |
| KR | 20150047052 A | 5/2015 |
| KR | 20150047053 A | 5/2015 |
| KR | 20160023990 A | 3/2016 |
| KR | 101718668 B1 | 3/2017 |
| KR | 20170075437 A | 7/2017 |
| KR | 20170076222 A | 7/2017 |
| KR | 20170095350 A | 8/2017 |
| WO | 2016035853 A1 | 3/2016 |
| WO | 2016148096 A1 | 9/2016 |

OTHER PUBLICATIONS

Search report from International Application No. PCT/KR2019/005428, mailed Aug. 19, 2019.
Chang-Heum Jo et al., "An effective method to reduce residual lithium compounds on Ni-rich Li[Ni0.6Co0.2Mn0.2]O2 active material using a phosphoric acid derived Li3PO4 nanolayer", Nano Research, Dec. 2014, vol. 8, No. 5, p. 1-16.
Kyoungmin Min et al., "Computational Screening for Design of Optimal Coating Materials to Suppress Gas Evolution in Li-Ion Battery Cathodes", ACS Applied Materials & Interfaces, May 2017, vol. 9, No. 21, pp. 17822-17834.
Yoojung Kim et al., "Lithium-Reactive Co3(PO4)2 Nanoparticle Coating on High-Capacity LiNi0.8Co0.16Al0.04O2 Cathode Material for Lithium Rechargeable Batteries", Journal of the Electrochemical Society, Apr. 2007, vol. 154, No. 6, pp. A495-A499.
Search Report dated Apr. 24, 2022 from Office Action for Chinese Application No. 201980027584.2 issued Apr. 28, 2022. 4 pgs.

* cited by examiner

*Primary Examiner* — Eli S Mekhlin
(74) *Attorney, Agent, or Firm* — Lerner David LLP

(57) ABSTRACT

A method of washing a positive electrode active material includes (1) preparing a lithium composite transition metal oxide which contains Ni, Co and Mn, and has the Ni content of 60 mol % or more; (2) putting the lithium composite transition metal oxide into water; and (3) adding a weak acid to water to which the lithium composite transition metal oxide is added to adjust the pH to 7 to 10, wherein the acid is a weak acid.

6 Claims, No Drawings

METHOD OF WASHING POSITIVE ELECTRODE ACTIVE MATERIAL, AND POSITIVE ELECTRODE ACTIVE MATERIAL PREPARED THEREBY

CROSS-REFERENCE TO RELATED APPLICATIONS

This application is a national phase entry under 35 U.S.C. § 371 of International Application No. PCT/KR2019/005428, filed May 7, 2019, which claims priority to Korean Patent Application No. 10-2018-0051714, filed May 4, 2018, the disclosures of which are incorporated herein by reference in their entirety.

TECHNICAL FIELD

The present invention relates to a positive electrode active material for a secondary battery, which includes a composite coating layer having excellent coatability, a method of preparing the same, and a lithium secondary battery including the same.

BACKGROUND ART

According to the increase in the development and demand for mobile devices, the demand for a secondary battery as an environmentally friendly alternative energy source is rapidly increasing. Among secondary batteries, a lithium secondary battery, which exhibits a high energy density and a high voltage, and has a longer cycle life and a low self-discharge rate, has been commercialized and widely used.

Lithium transition metal composite oxides are used as a positive electrode active material for a lithium secondary battery, and among them, the lithium cobalt composite metal oxide $LiCoO_2$ having a high operating voltage and an excellent capacity is mainly used. However, since $LiCoO_2$ has very poor thermal characteristics due to destabilization of a crystal structure due to delithiation and is expensive, there is a limit to mass use as a power source in the field of electric vehicles.

As an alternative for $LiCoO_2$, a lithium-manganese composite metal oxide ($LiMnO_2$ or $LiMn_2O_4$), a lithium iron phosphate compound ($LiFePO_4$) or a lithium nickel composite metal oxide ($LiNiO_2$) was developed. Among them, the research and development of lithium-nickel composite metal oxides, which easily implement a high-capacity battery due to a high reversible capacity of approximately 200 mAh/g is more actively performed. However, compared to $LiCoO_2$, $LiNiO_2$ has poor thermal stability and is decomposed when an internal short circuit occurs due to pressure from the outside when charging, thereby causing the battery to rupture and ignite.

For this reason, as a method of retaining the excellent reversible capacity of $LiNiO_2$ and improving low thermal stability, a nickel-cobalt-manganese-based lithium composite metal oxide in which some of nickel (Ni) is substituted with cobalt (Co) (hereinafter, simply referred to as a "NCM-based lithium oxide") has been developed.

The lithium composite transition metal oxide has lithium by-products such as $LiOH$ and $Li_2CO_3$ which do not react in the preparation thereof. Among these lithium by-products, $LiOH$ increases the pH of an electrode slurry to cause the gelation of an electrode slurry and generates moisture in the charging/discharging of the battery, and since $Li_2CO_3$ is the cause of the generation of gases such as $CO_2$ and $CO$, it highly affects the performance of the battery.

Among NCM-based lithium oxides, an NCM-based lithium oxide having an Ni content of 60% or more is washed with water to adjust the amount of a lithium by-product in the preparation. In this process, when all of the lithium by-products are removed, side reactions and corrosion of the surface of the NCM-based lithium oxide occur, and thus it is necessary to leave a certain amount of lithium by-products. However, when more than the required amount of lithium by-products remains, since it leads to the above-described problems of the lithium by-products, it is necessary to control lithium by-products at the surface of a positive electrode material to have a certain amount and a certain proportion.

When $LiOH$ and $Li_2CO_3$ are used as Li precursors in the preparation of the lithium composite transition metal oxide, $LiOH/Li_2CO_3$ proportions in the residual lithium compound are different, and the total amount of the lithium by-products will vary according to the atmosphere in sintering and the residence time of each process.

In previous washing processes, the washing amount of a lithium by-product may be adjusted by adjusting a water amount and a washing time, but when a water amount increases, processability is reduced, and it is impossible to selectively remove $LiOH$ and $Li_2CO_3$.

Therefore, there is a demand for the development of a washing technique for a positive electrode active material capable of effectively adjusting the washing amount of lithium by-products and selectively removing $LiOH$ and $Li_2CO_3$.

DISCLOSURE OF THE INVENTION

Technical Problem

The present invention is directed to providing a method of washing a positive electrode active material, which can effectively adjust the washing amount of lithium by-products and selectively remove $LiOH$ and $Li_2CO_3$.

The present invention is also directed to providing a method of preparing a positive electrode active material, which includes the method of washing a positive electrode active material.

The present invention is also directed to providing a positive electrode active material including a lithium composite transition metal oxide washed by the method of washing a positive electrode active material, a positive electrode for a lithium secondary battery including the same and a lithium secondary battery.

Technical Solution

In one aspect, the present invention provides a method of washing a positive electrode active material, which includes:
(1) preparing a lithium composite transition metal oxide which includes Ni, Co, and Mn, and an Ni content is 60 mol % or more, preferably 80 mol % or more;
(2) putting the lithium composite transition metal oxide into water; and
(3) adding a weak acid to the water to which the lithium composite transition metal oxide is input to adjust the pH to 7 to 10.

In another aspect, the present invention provides a method of preparing a positive electrode active material, which includes a method of washing a positive electrode active material.

In still another aspect, the present invention provides a positive electrode active material, which includes a lithium composite transition metal oxide and a lithium by-product present on the surface of the lithium composite transition metal oxide, wherein the lithium by-product is included at 0.3 to 0.41 mol % with respect to the total mole number of the lithium composite transition metal oxide, and the molar ratio of $Li_2CO_3$ and LiOH is 1:1.8 to 1:3.

Advantageous Effects

A method of washing a positive electrode active material according to the present invention can effectively adjust the washing amount of lithium remaining on the surface of a lithium composite transition metal oxide and selectively remove LiOH and $Li_2CO_3$, and therefore it can be effectively used in washing and preparation of a lithium composite transition metal oxide.

BEST MODE FOR CARRYING OUT THE INVENTION

Terms and words used in the specification and claims should not be construed as limited to general or dictionary meanings, and should be interpreted with meanings and concepts in accordance with the technical idea of the present invention based on the principle that the inventors have appropriately defined the concepts of terms in order to explain the invention in the best way.

The terms used herein are for describing exemplary embodiments and are not intended to limit the present invention. Herein, singular expressions include plural expressions unless specifically stated otherwise.

It should be understood that the term "comprise," "include," or "have" used herein is for indicating the presence of implemented characteristics, numbers, steps, elements or a combination thereof, and does not preclude possibility of the presence or addition of one or more other characteristics, numbers, steps, elements or a combination thereof.

The "%" used herein refers to wt % unless indicated otherwise.

The "mean particle diameter $(D_{50})$" refers to a particle diameter corresponding to 50% of a cumulative count in the particle diameter distribution curve, and the mean particle diameter $(D_{50})$ may be measured using, for example, a laser diffraction method.

The method of washing a positive electrode active material of the present invention includes (1) preparing a lithium composite transition metal oxide which contains Ni, Co and Mn, and has the Ni content of 60 mol % or more;

(2) putting the lithium composite transition metal oxide into water; and (3) adding a weak acid to water to which the lithium composite transition metal oxide is added to adjust the pH to 7 to 10.

According to the method of washing a positive electrode active material according to the present invention, in step (3) of adding a weak acid to water into which the lithium composite transition metal oxide is added to adjust the pH to 7 to 10, a weak acid is used as an acid.

(1) Step of Preparing Lithium Composite Transition Metal Oxide, which Contains Ni, Co and Mn and has Ni Content of 60 Mol % or More In step (1), a lithium composite transition metal oxide, which contains Ni, Co, and Mn and has the Ni content of 60 mol % or more, is prepared.

The lithium composite transition metal oxide may be prepared using a commercially available lithium composite transition metal oxide or a known method of preparing a lithium composite transition metal oxide.

For example, the lithium composite transition metal oxide may be prepared by a method of mixing a transition metal precursor and a lithium raw material and sintering the resulting mixture.

The transition metal precursor may be a hydroxide, an oxy hydroxide, a carbonate, or an organic complex, which contains Ni, Co or Mn. Specifically, the transition metal precursor may be a nickel-cobalt hydroxide, a nickel-cobalt oxy hydroxide, a nickel-cobalt-manganese hydroxide or a nickel-cobalt-manganese oxy hydroxide, or an M-doped hydroxide or oxy hydroxide, but the present invention is not limited thereto.

The lithium raw material may be a carbonate (e.g., lithium carbonate), hydrate (e.g., lithium hydroxide monohydrate ($LiOHH_2O$), hydroxide (e.g., lithium hydroxide), nitrate (e.g., lithium nitrate ($LiNO_3$), or chloride (e.g., lithium chloride (LiCl)) containing lithium, but the present invention is not limited thereto.

In one exemplary embodiment of the present invention, the lithium composite transition metal oxide may include a doping metal as needed. The doping metal may be included by a method of mixing, for example, a doping metal-containing raw material with the transition metal precursor and the lithium raw material and sintering the resulting mixture.

The doping metal-containing raw material may be an oxide, a hydroxide, a sulfide, an oxyhydroxide, a halide, which includes a doping metal element, or a mixture thereof. For example, the doping metal-containing raw material may be ZnO, $Al_2O_3$, $Al(OH)_3$, $AlSO_4$, $AlCl_3$, Al-isopropoxide, $AlNO_3$, $TiO_2$, $WO_3$, AlF, $H_2BO_3$, $HBO_2$, $H_3BO_3$, $H_2B_4O_7$, $B_2O_3$, $C_6H_5B(OH)_2$, $(C_6H_5O)_3B$, $[(CH_3\ (CH_2)_3O)_3B$, $C_3H_9B_3O_6$, $(C_3H_7O_3)B$, $Li_3WO_4$, $(NH_4)_{10}W_{12}O_{41}\cdot5H_2O$, or $NH_4H_2PO_4$, but the present invention is not limited thereto.

Meanwhile, the sintering may be performed at 600 to 1000° C., and preferably, 700° C. to 900° C. for 5 to 30 hours, and preferably, 10 to 20 hours.

In one exemplary embodiment of the present invention, the lithium composite transition metal oxide may be a compound represented by Formula 1 below.

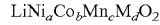

$$LiNi_aCo_bMn_cM_dO_2 \qquad \text{[Formula 1]}$$

(a≥0.6, 0<b<0.25, 0<c<0.25, 0≤d≤0.2, a+b+c+d=1, and M is one or more doping elements selected from the group consisting of W, Cu, Fe, V, Cr, Ti, Zr, Zn, Al, In, Ta, Y, La, Sr, Ga, Sc, Gd, Sm, Ca, Ce, Nb, Mg, B, and Mo)

The "a" represents the atomic fraction of nickel in the lithium composite transition metal oxide, and may satisfy a≥0.6, specifically 0.7<a<0.95, and more specifically 0.8≤a≤0.9.

The "b" represents the atomic fraction of cobalt in the lithium composite transition metal oxide, and may satisfy 0<b<0.25, and specifically 0.05≤b<0.15.

The "c" represents the atomic fraction of manganese in the lithium composite transition metal oxide, and may satisfy 0<c<0.25, and specifically 0.05≤c<0.15.

The "d" represents the atomic fraction of the M element in the lithium composite transition metal oxide, and may satisfy 0≤d≤0.2, and specifically 0≤d≤0.1.

(2) Step of Putting Lithium Composite Transition Metal Oxide into Water

In step (2), the lithium composite transition metal oxide was put into water for washing.

A lithium composite transition metal oxide obtained by sintering a nickel-containing composite transition metal oxide, particularly, a nickel-containing composite hydroxide or a nickel-containing composite oxide, and a lithium compound, has an unreacted lithium compound on the surface of a primary particle and/or a secondary particle. Therefore, through a washing process, an unreacted lithium compound such as excessive lithium hydroxide or lithium carbonate, which deteriorates battery characteristics, and other impurity elements may be removed from a lithium composite transition metal oxide particle.

Therefore, after the lithium composite transition metal oxide is prepared, a step of washing the lithium composite transition metal oxide is performed.

When the lithium composite transition metal oxide is put into water, the water amount may be 30 to 150 parts by weight, specifically 40 to 120 parts by weight, and more specifically 80 to 120 parts by weight with respect to 100 parts by weight of the lithium composite transition metal oxide.

When the amount of water used for the lithium composite transition metal oxide is insufficient, more unreacted lithium compound than necessary may remain, and when the amount of water used for the lithium composite transition metal oxide is excessive, in addition to the unreacted lithium compound, a lithium compound present on the surface of the lithium composite transition metal oxide particle is removed, resulting in a side reaction and corrosion on the surface of the lithium composite transition metal oxide particle. Therefore, when the proportion of water with respect to the lithium composite transition metal oxide is within the above range, washing may be more suitably performed.

After the lithium composite transition metal oxide is put into water, the resulting solution may be stirred for 1 to 10 minutes, and specifically 1 to 5 minutes. Through the stirring, the lithium composite transition metal oxide powder may form a slurry with the water.

(3) Step of Adding Weak Acid to Water to which Lithium Composite Transition Metal Oxide is Added to Adjust pH to 7 to 10

After the lithium composite transition metal oxide is put into water, a weak acid is added thereto, thereby adjusting the pH to 7 to 10.

When the lithium composite transition metal oxide is put into water, the water containing the lithium composite transition metal oxide is basic at approximately pH 11, and therefore, a process of adjusting the pH to 7 to 10 by adding a weak acid to the resulting solution is performed. When the pH of the water containing the lithium composite transition metal oxide is changed, an amount of the lithium by-product removed in the process of washing the lithium composite transition metal oxide may be adjusted according to the type of the individual lithium by-product. For example, the lithium by-product present on the surface of the lithium composite transition metal oxide may include $Li_2CO_3$ and LiOH, and when the pH is close to 7, in the washing process, since the $Li_2CO_3$ content further decreases, the ratio of $Li_2CO_3$ and LiOH in the lithium by-product may be adjusted.

The pH may be in a range of 7 to 10, specifically 7 to 9, and more specifically 7 or more to less than 9.

When the pH is in the above-mentioned range, the ratio of $Li_2CO_3$ and LiOH in the lithium by-product may be more suitably adjusted, and the molar ratio of $Li_2CO_3$ and LiOH may be 1:1.8 to 1:3. In addition, the ratio of $Li_2CO_3$ and LiOH is specifically 1:1.9 to 1:3, and more specifically 1:2 to 1:2.5. When $Li_2CO_3$ and LiOH satisfy the above-mentioned molar ratio, the generation of gas due to the presence of $Li_2CO_3$ may be suitably inhibited, and the effect of improving capacity characteristics and lifetime characteristics may be exhibited.

The weak acid may be one or more selected from the group consisting of phosphoric acid, acetic acid, oxalic acid, citric acid and boric acid, specifically phosphoric acid and citric acid.

Compared to when a strong acid is used, when a weak acid is used for pH adjustment, corrosion of the lithium composite transition metal oxide caused by an acid in the washing process is less, and compared to a strong acid, it is easier to adjust pH and thus the removal of a lithium by-product may be more effectively performed.

In an exemplary embodiment of the present invention, the process of adding a weak acid may be performed by putting phosphorous pentoxide ($P_2O_5$) powder, citric acid powder or a mixture thereof into water containing the lithium composite transition metal oxide. When an acidic aqueous solution is added in the process of adding an acid, a solid content in a slurry of the lithium composite transition metal oxide powder and water is reduced. However, when the phosphorous pentoxide ($P_2O_5$) or citric acid is put into water in a powder form, the solid content may not be changed according to further addition of water. As the phosphorous pentoxide is converted into phosphoric acid ($H_3PO_4$) in water, the aqueous solution thereof becomes a weak acid, and the phosphate pentoxide may be added in the form of an aqueous solution thereof.

The temperature in the washing process including steps (2) and (3) may be 10° C. to 40° C., and specifically 20° C. to 30° C.

In addition, when the washing temperature is excessively low, an unreacted lithium compound may remain, and when the washing temperature is excessively high, a lithium by-product is excessively removed, or in addition to the unreacted lithium compound, a lithium compound present on the surface of the lithium composite transition metal oxide particle is removed, and thus a side reaction or corrosion may occur. Therefore, when washing is performed in the above-mentioned temperature range, an unreacted lithium compound may be more effectively removed.

The method of washing a positive electrode active material according to the present invention may be included in a method of preparing a positive electrode active material, and therefore, the present invention provides a method of preparing a positive electrode active material including the method of washing a positive electrode active material.

The method of preparing a positive electrode active material according to an exemplary embodiment of the present invention may further include a filtering step and a solid-liquid separation step, performed on the lithium composite transition metal oxide that had been prepared and washed through the above-described steps, and then a drying step. In addition, the washed lithium composite transition metal oxide may be used in a moisture-added form without additional drying.

In addition, a method of preparing a positive electrode active material according to another exemplary embodiment of the present invention may further include a step of forming a coating layer on the washed lithium composite transition metal oxide.

The step of forming a coating layer may include thermal treatment after the washed lithium composite transition metal oxide and a coating raw material are mixed.

When a coating layer is formed on the washed lithium composite transition metal oxide, destabilization of a defect or corrosion on the surface of the lithium composite transition metal oxide may be controlled.

The coating layer may include one or more metal or metalloid elements, and the coating layer may be formed by mixing the washed lithium composite transition metal oxide and a coating raw material and performing thermal treatment.

The present invention also provides a positive electrode active material, which includes a lithium composite transition metal oxide washed by the method of washing a positive electrode active material and a lithium by-product present on the surface of the lithium composite transition metal oxide.

The lithium by-product present on the surface of the lithium composite transition metal oxide may include $Li_2CO_3$ and LiOH in a molar ratio of 1:1.8 to 1:3.

The lithium by-product may be included at 0.3 mol % to 0.41 mol %, specifically 0.32 mol % to 0.41 mol %, and more specifically 0.35 mol % to 0.41 mol % with respect to the total mole number of the lithium composite transition metal oxide on the surface by washing the lithium composite transition metal oxide by the above-described washing method.

When the mol % of the lithium by-product exceeds the above-mentioned range, LiOH increases the pH of an electrode slurry, and thus becomes the cause of the gelation of the electrode slurry and generates moisture during charging/discharging of the battery. $Li_2CO_3$ becomes the cause of the generation of gas such as $CO_2$ and CO, thereby lowering the performance of a battery, and when the mol % of the lithium by-product is less than the above-mentioned range, the amount of residual lithium needed to form a coating layer may not be satisfied in the positive electrode active material, and the surface of the positive electrode active material is corroded (release of inner lithium to outside), resulting in the degradation of capacity characteristics and lifetime characteristics.

In the positive electrode active material according to an exemplary embodiment of the present invention, the lithium composite transition metal oxide may include 0.05 to 0.14 mol % of $Li_2CO_3$ and 0.15 mol % to 0.27 mol % of LiOH with respect to the total mole number of the lithium composite transition metal oxide.

In addition, the lithium composite transition metal oxide includes $Li_2CO_3$ on its surface at specifically 0.08 mol % to 0.14 mol % and more specifically 0.1 mol % to 0.135 mol % with respect to the total mole number of the lithium composite transition metal oxide. When the lithium composite transition metal oxide includes $Li_2CO_3$ on its surface in the above-mentioned content range, the generation of a gas due to the presence of $Li_2CO_3$ may be suitably inhibited, and an improved effect of improving capacity characteristics and lifetime characteristics may be optimally obtained.

In addition, the lithium composite transition metal oxide may include LiOH on its surface at specifically 0.15 mol % to 0.27 mol % and more specifically 0.24 mol % to 0.26 mol % with respect to the total mole number of the lithium composite transition metal oxide.

When the lithium composite transition metal oxide includes LiOH on its surface at the above-mentioned content range, LiOH reacts with boron (B) when a coating layer is additionally formed on the lithium composite transition metal oxide, and particularly, when a boron (B)-containing coating layer is formed, thereby effectively forming the coating layer, and preventing side effects such as the gelation of an electrode slurry due to residual LiOH and moisture generation in charging/discharging of a battery.

The lithium composite transition metal oxide according to an exemplary embodiment of the present invention may include $Li_2CO_3$ and LiOH on its surface at adjusted amounts in a proper ratio. For example, the lithium by-product may include $Li_2CO_3$ and LiOH at a molar ratio of 1:1.8 to 1:3, specifically 1:1.9 to 1:3, and more specifically 1:2 to 1:2.5. When $Li_2CO_3$ and LiOH satisfy the above-mentioned molar ratio, gas generation due to the presence of $Li_2CO_3$ may be suitably inhibited, and an effect of improving capacity characteristics and lifetime characteristics may be optimally exhibited.

A coating layer further including one or more metal or metalloid elements on the surface of the lithium composite transition metal oxide may be formed, and the coating layer may contain lithium derived from the lithium by-product.

The coating layer may include a lithium-tungsten oxide in which lithium and tungsten are combined, or a boron compound containing boron and oxygen. The lithium-tungsten oxide may be, for example, $Li_2WO_4$ and $Li_6W_2O_9$, and the boron compound may be, for example, lithium borate, boron oxide, boric acid, boron oxoacid, or a salt of boron oxoacid.

The positive electrode active material for a secondary battery according to the present invention may be usefully used in the manufacture of a positive electrode for a secondary battery.

When a positive electrode for a secondary battery is manufactured using the positive electrode active material for a secondary battery according to an exemplary embodiment of the present invention, and a half cell using a lithium metal as a negative electrode is manufactured using the positive electrode, a resistance increase rate after 50 cycles may be 200% or less, specifically 100% to 200%, and more specifically 101% to 180%.

Since the positive electrode active material for a secondary battery according to an exemplary embodiment of the present invention is prepared by a washing method including adding a weak acid to adjust the pH to 7 to 10 in washing of the lithium composite transition metal oxide in the preparation of the positive electrode active material, there is less corrosion of the lithium composite transition metal oxide due to an acid in the washing process, and thus excellent cycle characteristics may be exhibited in the manufacture of a positive electrode and a lithium secondary battery using the positive electrode active material.

Specifically, the positive electrode for a secondary battery according to the present invention includes a positive electrode collector and a positive electrode active material layer formed on the positive electrode collector, wherein the positive electrode active material layer includes the positive electrode active material according to the present invention.

The positive electrode may be manufactured according to a conventional method of manufacturing a positive electrode, except that the positive electrode active material according to the present invention is used. For example, the positive electrode may be manufactured by preparing a positive electrode mixed material by dissolving or dispersing components constituting the positive electrode active material layer, that is, the positive electrode active material, a conductive material and/or a binder, in a solvent, coating at least one surface of a positive electrode collector with the positive electrode mixed material, and then drying and roll-pressing the coated product, or by casting the positive electrode mixed material on a separate support and laminating a film obtained by delamination from the support on the positive electrode collector.

Here, the positive electrode current collector is not particularly limited as long as it has conductivity without causing a chemical change in a battery, and for example, stainless steel, aluminum, nickel, titanium, calcined carbon, or aluminum or stainless steel whose surface is treated with carbon, nickel, titanium or silver may be used. In addition, the positive electrode current collector may generally have a thickness of 3 μm to 500 μm, and the adhesive strength of the positive electrode active material may be increased by forming fine irregularities on the surface of the current collector. For example, the positive electrode current collector used in various forms such as a film, a sheet, a foil, a net, a porous body, foam, a non-woven fabric, etc.

A positive electrode active material layer including the positive electrode active material according to the present invention and further including at least one selected from a conductive material and a binder as needed is disposed on at least one surface of the current collector.

The positive electrode active material includes the positive electrode active material according to the present invention, that is, the lithium composite metal oxide represented by Formula 1, and a surface treatment layer including cobalt-lithium composite particles, which is attached to the surface of the lithium composite metal oxide. Since the details of the positive electrode active material according to the present invention are the same as described above, a detailed description thereof will be omitted.

The positive electrode active material may be included at a content of 80 to 99 wt %, and more specifically 85 to 98 wt % with respect to the total weight of the positive electrode active material layer. When the positive electrode active material is included in the above-mentioned content range, excellent capacity characteristics may be exhibited.

The conductive material is used to impart conductivity to an electrode, and is not particularly limited as long as it has electron conductivity without causing a chemical change in a battery. A specific example of the conductive material may be graphite such as natural graphite or artificial graphite; a carbon-based material such as carbon black, acetylene black, Ketjen black, channel black, furnace black, lamp black, thermal black or a carbon fiber; a metal powder or metal fiber consisting of copper, nickel, aluminum, or silver; a conductive whisker consisting of zinc oxide or potassium titanate; a conductive metal oxide such as titanium oxide; or a conductive polymer such as a polyphenylene derivative, and one or a mixture of two or more thereof may be used. The conductive material may generally be included at 1 wt % to 30 wt % with respect to the total weight of the positive electrode active material layer.

In addition, the binder serves to enhance the cohesion between the positive electrode active material particles and the adhesive strength between the positive electrode active material and the positive electrode current collector. A specific example of the binder may be polyvinylidene fluoride (PVDF), a polyvinylidene fluoride-hexafluoropropylene-co-polymer (PVDF-co-HFP), polyvinyl alcohol, polyacrylonitrile, carboxymethylcellulose (CMC), starch, hydroxypropylcellulose, regenerated cellulose, polyvinylpyrrolidone, polytetrafluoroethylene, polyethylene, polypropylene, an ethylene-propylene-diene polymer (EPDM), a sulfonated-EPDM, styrene butadiene rubber (SBR), fluorine rubber, or various copolymers thereof, and one or a mixture of two or more thereof may be used. The binder may be included at 1 wt % to 30 wt % with respect to the total weight of the positive electrode active material layer.

Meanwhile, a solvent used in the preparation of a positive electrode mixed material may be a solvent generally used in the art, and for example, dimethyl sulfoxide (DMSO), isopropyl alcohol, N-methylpyrrolidone (NMP), acetone or water may be used independently or in combination thereof. The amount of the solvent used herein may be suitably adjusted in consideration of the coating thickness, production yield, and viscosity of a slurry.

Next, a secondary battery according to the present invention will be described.

A secondary battery according to the present invention includes a positive electrode, a negative electrode facing the positive electrode, and a separator and an electrolyte interposed between the positive electrode and the negative electrode, wherein the positive electrode is the above-described positive electrode according to the present invention.

Meanwhile, the secondary battery may further include a battery case for accommodating an electrode assembly including the positive electrode, the negative electrode and the separator, and selectively, a sealing member for sealing the battery case.

In the secondary battery, the negative electrode includes a negative electrode collector and a negative electrode active material layer disposed on at least one surface of the negative electrode collector.

The negative electrode may be manufactured according to a conventional method of manufacturing a negative electrode generally known in the art. For example, the negative electrode may be manufactured by preparing a negative electrode mixed material by dissolving or dispersing components constituting the negative electrode active material layer, that is, the negative electrode active material, a conductive material and/or a binder in a solvent, coating at least one surface of a negative electrode collector with the negative electrode mixed material, and then drying and roll-pressing the coated product, or by casting the negative electrode mixed material on a separate support and laminating a film obtained by delamination from the support on the negative electrode collector.

The negative electrode current collector is not particularly limited as long as it has high conductivity without causing a chemical change in a battery, and may be, for example, copper, stainless steel, aluminum, nickel, titanium, calcined carbon, or copper or stainless steel whose surface is treated with carbon, nickel, titanium or silver, or an aluminum-cadmium alloy. In addition, the negative electrode current collector may generally have a thickness of 3 to 500 μm, and like the positive electrode current collector, fine irregularities may be formed on the current collector surface, thereby reinforcing the binding strength of the negative electrode active material. For example, the negative electrode current collector may be used in various forms such as a film, a sheet, a foil, a net, a porous body, foam, a nonwoven fabric, etc.

As the negative electrode active material, a compound enabling the reversible intercalation and deintercalation of lithium may be used. A specific example of the negative electrode active material may be a carbon-based material such as artificial graphite, natural graphite, graphitized carbon fiber or amorphous carbon; a (semi) metal-based material capable of alloying with lithium, such as Si, Al, Sn, Pb, Zn, Bi, In, Mg, Ga, Cd, a Si alloy, a Sn alloy or an Al alloy; a metal oxide capable of doping and undoping lithium such as $SiO_v$ (0<v<2), $SnO_2$, vanadium oxide, or lithium vanadium oxide; or a composite including the (semi) metal-based material and the carbon-based material such as a Si—C composite or a Sn—C composite, and any one or a mixture of two or more thereof may be used. In addition, as the negative electrode active material, a metal lithium thin film may be used. In addition, as a carbon material, both of low-crystalline carbon and high-crystalline carbon may be used. Representative examples of the low-crystalline carbon include soft carbon and hard carbon, and representative examples of the high-crystalline carbon include amorphous, sheet-type, flake-type, spherical or fiber-type natural or artificial graphite, Kish graphite, pyrolytic carbon, mesophase pitch-based carbon fiber, meso-carbon microbeads, mesophase pitches, and high temperature calcined carbon such as petroleum or coal tar pitch derived cokes.

In addition, the binder and the conductive material may be the same as described above for the positive electrode.

Meanwhile, in the lithium secondary battery, a separator is not particularly limited as long as it is generally used in a lithium secondary battery to separate a negative electrode from a positive electrode and provide a moving path for lithium ions, and particularly, it is preferable that the separator has low resistance to ion mobility of an electrolyte and an excellent ability to be impregnated with an electrolyte solution. Specifically, a porous polymer film, for example, a porous polymer film formed of a polyolefin-based polymer such as an ethylene homopolymer, a propylene homopolymer, an ethylene/butene copolymer, an ethylene/hexene copolymer and an ethylene/methacrylate copolymer, or a stacked structure including two or more layers thereof may be used. In addition, a conventional porous non-woven fabric, for example, a non-woven fabric formed of a high melting point glass fiber or a polyethylene terephthalate fiber may be used. In addition, a coated separator including a ceramic component or a polymer material may be used to ensure thermal resistance or mechanical strength, and may be selectively used in a single- or multi-layered structure.

Meanwhile, as the electrolyte, an organic liquid electrolyte, an inorganic liquid electrolyte, a solid polymer electrolyte, a gel-type polymer electrolyte, a solid inorganic electrolyte, or a melt-type inorganic electrolyte, which can be used in manufacture of a lithium secondary battery, may be used, but the present invention is not limited thereto.

Specifically, the electrolyte may include an organic solvent and a lithium salt.

The organic solvent is not particularly limited as long as it can serve as a medium enabling the mobility of ions involved in an electrochemical reaction of a battery. Specifically, the organic solvent may be an ester-based solvent such as methyl acetate, ethyl acetate, Y-butyrolactone, or ε-caprolactone; an ether-based solvent such as dibutyl ether or tetrahydrofuran; a ketone-based solvent such as cyclohexanone; an aromatic hydrocarbon-based solvent such as benzene or fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), or propylene carbonate (PC); an alcohol-based solvent such as ethyl alcohol or isopropyl alcohol; a nitrile-based solvent such as Ra—CN (Ra is a linear, branched or cyclic C2 to C20 hydrocarbon group, and may include a double bonded aromatic ring or an ether bond); an amide-based solvent such as dimethylformamide; a dioxolane-based solvent such as 1,3-dioxolane; or a sulfolane-based solvent. Among these, a carbonate-based solvent is preferably used, and a mixture of a cyclic carbonate having high ion conductivity and high permittivity to increase the charge/discharge performance of a battery (for example, ethylene carbonate or propylene carbonate) and a low-viscosity linear carbonate-based compound (for example, ethyl methyl carbonate, dimethyl carbonate or diethyl carbonate) is more preferably used. In this case, by using a mixture of a cyclic carbonate and a chain-type carbonate in a volume ratio of about 1:1 to about 1:9, the electrolyte solution may exhibit excellent performance.

The lithium salt is not particularly limited as long as it is a compound capable of providing lithium ions used in a lithium secondary battery. Specifically, the lithium salt may be $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$. The concentration of the lithium salt is preferably in the range of 0.1 to 2.0M. When the concentration of the lithium salt is included in the above-mentioned range, the electrolyte has suitable conductivity and viscosity and thus can exhibit excellent electrolytic performance. Therefore, lithium ions can effectively migrate.

To enhance lifetime characteristics of the battery, inhibit a decrease in battery capacity, and enhance the discharge capacity of the battery, the electrolyte may further include one or more types of additives, for example, a haloalkylenecarbonate-based compound such as difluoroethylene carbonate, pyridine, triethylphosphite, triethanolamine, cyclic ether, ethylene diamine, n-glyme, hexamethylphosphoric triamide, a nitrobenzene derivative, sulfur, a quinone imine dye, N-substituted oxazolidinone, N, N-substituted imidazolidine, ethylene glycol dialkyl ether, an ammonium salt, pyrrole, 2-methoxy ethanol or aluminum trichloride. Here, the additive (s) may be included at 0.1 to 5 wt % with respect to the total weight of the electrolyte.

Since the secondary battery including the positive electrode active material has excellent capacity characteristics and stability at high voltage, it may be usefully applied to portable devices such as a mobile phone, a notebook computer and a digital camera and an electric automobile field such as a hybrid electric vehicle (HEV).

In addition, the secondary battery according to the present invention may be used as a unit cell of a battery module, and the battery module may be applied to a battery pack. The battery module or battery pack may be used in any one or more medium-to-large devices including a power tool; an electric motor vehicle such as an electric vehicle (EV), a hybrid electric vehicle, and a plug-in hybrid electric vehicle (PHEV); and a power storage system.

MODE FOR CARRYING OUT THE INVENTION

Hereinafter, embodiments of the present invention will be described in detail with reference to the accompanying drawings so that those of ordinary skill in the art can easily carry out the present invention. However, the present invention may be implemented in a variety of different forms, and is not limited to the embodiments described herein.

Example 1

50 g of a $LiNi_{0.8}Mn_{0.1}Co_{0.1}O_2$ (NMC (811)) positive electrode active material was put into 50 g of water and stirred for 2 minutes, and then 1.25 g of a 10% (w/w) $P_2O_5$ aqueous solution was added until the pH became 7. The resulting solution was further stirred for 2 minutes, water was removed using a reduced pressure filter for 2 minutes, and then the resulting product was dried in a vacuum oven, thereby completing the washing of the positive electrode active material.

Example 2

The washing of a positive electrode active material was completed by the method described in Example 1, except that 25 g of water was used.

Example 3

The washing of a positive electrode active material was completed by the method described in Example 1, except that 0.75 g of a 10% (w) $P_2O_5$ aqueous solution was added until the pH became 9.

Example 4

50 g of a NMC (811) positive electrode active material was put into 50 g of water and stirred for 2 minutes, and then a 20% (w/w) $P_2O_5$ aqueous solution was added until the pH became 7. The resulting solution was further stirred for 5 minutes, water was removed using a reduced pressure filter for 2 minutes, and then the resulting product was dried in a vacuum oven, thereby completing the washing of the positive electrode active material.

Example 5

The washing of a positive electrode active material was completed by the method described in Example 1, except that a 0.1 mol % citric acid ($C_6H_8O_7$) aqueous solution, instead of the 10% (w/w) $P_2O_5$ aqueous solution used in Example 1, was added until the pH became 7.

Comparative Example 1

50 g of a NMC (811) positive electrode active material was put into 50 g of water and stirred for 5 minutes, water was removed using a reduced pressure filter for 2 minutes, and then the resulting product was dried in a vacuum oven, thereby completing the washing of the positive electrode active material.

Comparative Example 2

50 g of a NMC (811) positive electrode active material was put into 25 g of water and stirred for 5 minutes, water was removed using a reduced pressure filter for 2 minutes, and then the resulting product was dried in a vacuum oven, thereby completing the washing of the positive electrode active material.

Comparative Example 3

50 g of a NMC (811) positive electrode active material was put into 50 g of water and stirred for 2 minutes, and a 20% (w/v) HCl aqueous solution was added until the pH became 7. The resulting solution was further stirred for 5 minutes, water was removed using a reduced pressure filter for 2 minutes, and then the resulting product was dried in a vacuum oven, thereby completing the washing of the positive electrode active material.

Comparative Example 4

50 g of a NMC(811) positive electrode active material was put into 50 g of water and stirred for 2 minutes, and a 3% (w/v) HCl aqueous solution was added until the pH became 7. The resulting solution was further stirred for 5 minutes, water was removed using a reduced pressure filter for 2 minutes, and then the resulting product was dried in a vacuum oven, thereby completing the washing of the positive electrode active material.

Experimental Example 1

The content of a lithium by-product was measured by a Warder titration method of titrating amounts of an $OH^-$ ion and a $CO_3^{2-}$ ion in the washed positive electrode active material in each of Examples 1 to 5 and Comparative Examples 1 to 4 using an 888 Titrando instrument (Mettler Toledo) and the result is shown in Table 1 below.

TABLE 1

| | Lithium by-product (mol %) | | | |
| --- | --- | --- | --- | --- |
| | $Li_2CO_3$ | LiOH | Total | $Li_2CO_3$/LiOH |
| Example 1 | 0.102 | 0.249 | 0.351 | 0.40 |
| Example 2 | 0.133 | 0.268 | 0.401 | 0.49 |
| Example 3 | 0.133 | 0.254 | 0.387 | 0.52 |
| Example 4 | 0.095 | 0.238 | 0.323 | 0.35 |
| Example 5 | 0.112 | 0.251 | 0.363 | 0.45 |
| Comparative Example 1 | 0.155 | 0.266 | 0.421 | 0.58 |
| Comparative Example 2 | 0.186 | 0.306 | 0.492 | 0.61 |
| Comparative Example 3 | 0.068 | 0.192 | 0.260 | 0.35 |
| Comparative Example 4 | 0.083 | 0.218 | 0.301 | 0.38 |

Referring to Table 1, compared to the washed positive electrode active materials in Comparative Examples 1 and 2, the washed positive electrode active materials in Examples 1 to 5 have a low amount of a lithium by-product, and have a higher amount of removed $Li_2CO_3$ than that of removed LiOH, confirming that the ratio of $Li_2CO_3$/LiOH is relatively small.

In Comparative Example 3, the amount of a residual lithium by-product was merely 0.260 mol %, which cannot satisfy an amount of residual lithium needed when a coating layer is formed on the positive electrode active material, and leads to degradation of capacity characteristics and lifetime characteristics due to corrosion (release of internal lithium to outside) of the surface of the positive electrode active material.

Experimental Example 2

A positive electrode slurry was prepared by adding a mixture of the washed positive electrode active material according to each of Examples 1 to 4 and Comparative Examples 1 to 3 with carbon black as a conductive material and polyvinylidene fluoride (PVDF) as a binder in a weight ratio of 97.5:1:1.5 to N-methyl-2-pyrrolidone (NMP) as a solvent.

Each of the prepared positive electrode slurries was applied on an aluminum (Al) thin film as a positive electrode current collector to a thickness of approximately 20 μm and dried, and then subjected to roll pressing, thereby manufacturing a positive electrode.

A coin-type half cell was manufactured by interposing a polyethylene porous membrane between the manufactured positive electrode and a lithium metal as a negative electrode, and injecting an electrolyte in which 1M $LiPF_6$ was dissolved in a solvent in which ethylene carbonate (EC) and diethyl carbonate (DEC) were mixed in a volume ratio of 30:70.

The half cell manufactured as described above was charged once at 0.1 C. Afterward, the half cell was allowed to stand for 20 minutes and discharged at a constant current (CC) of 0.1 C to measure a charge capacity and a discharge capacity and initial efficiency, and then the result is shown in Table 2 below.

TABLE 2

| | Measurement of initial efficiency (0.1 C) | | |
|---|---|---|---|
| | Charge capacity (mA) | Discharge capacity (mAh/g) | Efficiency (%) |
| Example 1 | 228.6 | 206.6 | 90.4 |
| Example 2 | 227.0 | 205.5 | 90.5 |
| Example 3 | 228.4 | 206.2 | 90.3 |
| Example 4 | 226.6 | 205.4 | 90.7 |
| Example 5 | 228.6 | 206.4 | 90.3 |
| Comparative Example 1 | 227.3 | 206.0 | 90.6 |
| Comparative Example 2 | 223.5 | 203.7 | 91.1 |
| Comparative Example 3 | 222.6 | 200.1 | 89.9 |
| Comparative Example 4 | 223.7 | 202.8 | 90.6 |

Experimental Example 3

A coin-type half cell manufactured using each of the washed positive electrode active materials according to Example 4 and Comparative Example 3, which were manufactured in Experimental Example 2, was charged/discharged at 45° C. and 0.33 C, thereby measuring a discharge capacity, and also a voltage drop for 60 seconds of discharging was measured to measure cell resistance. The above-described process was repeatedly performed for 1 to 50 cycles, and the result is shown in Table 3 below.

TABLE 3

| | Evaluation of lifetime characteristic (capacity) | | Evaluation of resistance increase | |
|---|---|---|---|---|
| | 30 cycles | 50 cycles | 30 cycles | 50 cycles |
| Example 1 | 97.8% | 95.8% | 45% | 101% |
| Example 2 | 96.4% | 94.1% | 57% | 160% |
| Example 3 | 97.2% | 95.1% | 51% | 142% |
| Example 4 | 97.0% | 94.4% | 60% | 178% |
| Example 5 | 97.5% | 95.2% | 49% | 112% |
| Comparative Example 1 | 94.3% | 90.7% | 152% | 323% |
| Comparative Example 2 | 91.5% | 84.1% | 195% | 423% |
| Comparative Example 3 | 93.8% | 89.4% | 134% | 289% |
| Comparative Example 4 | 94.1% | 91.2% | 105% | 223% |

Referring to Table 2, the batteries manufactured using the washed positive electrode active materials according to Examples 1 to 5 and Comparative Examples 1 to 4 had no significant difference in initial efficiency.

However, referring to Table 3, compared to the batteries manufactured using the positive electrode active materials of Comparative Examples 1 and 2 to which an acid was not added and the batteries manufactured using positive electrode active materials of Comparative Examples 3 and 4 in which hydrochloric acid was used as an acid, it can be confirmed that the batteries manufactured using the positive electrode active materials of Examples 1 to 4 to which phosphoric acid was added in the process of pH adjustment and Example 5 in which citric acid was added have an excellent lifetime characteristics, and a low resistance increase rate according to an increased cycle number.

Meanwhile, when a strong acid, HCL, was used at a low concentration as in Comparative Example 4, as confirmed in Table 1, the total amount of a residual lithium by-product was as low as 0.301 mol %, the $Li_2CO_3$/LiOH ratio was relatively low, and this case was more effective than Comparative Examples 1 and 2 using water and Comparative Example 3 using a relatively high concentration of HCl. However, as confirmed in Table 3, when a strong acid was used at a low concentration, compared to Examples 1 to 5 using a weak acid, this is less effective in terms of lifetime characteristics and an increase in resistance according to an increased cycle number.

This is because, when a weak acid such as phosphoric acid or citric acid is used as an acid as in Examples 1 to 5, compared to the case using a strong acid, the lithium composite transition metal oxide was less corroded by an acid in the washing process.

In addition, it can be confirmed that, when a weak acid was used for pH adjustment as in Examples and Comparative Examples, compared to the case using a strong acid, it was easy to adjust pH, and thus the removal of the lithium by-product was more effectively and easily performed.

The invention claimed is:

1. A method of washing a positive electrode active material, comprising:
    (1) preparing a lithium composite transition metal oxide which comprises Ni, Co, and Mn, and an Ni content is 60 mol % or more;
    (2) putting the lithium composite transition metal oxide into water; and
    (3) adding a weak acid to the water to decrease the pH to 7 to 10,
    wherein the weak acid is one or more selected from the group consisting of phosphorous pentoxide ($P_2O_5$), phosphoric acid, acetic acid, oxalic acid, citric acid, and boric acid.

2. The method of claim 1, wherein the Ni content is 80 mol % or more.

3. The method of claim 1, wherein the lithium composite transition metal oxide is represented by Formula 1 below $$LiNi_aCo_bMn_cM_dO_2 \quad \text{[Formula 1]}$$

wherein a≥0.6, 0<b<0.25, 0<c<0.25, 0≤d≤0.2, a+b+c+d=1, and M is one or more doping elements selected from the group consisting of W, Cu, Fe, V, Cr, Ti, Zr, Zn, Al, In, Ta, Y, In, La, Sr, Ga, Sc, Gd, Sm, Ca, Ce, Nb, Mg, B, and Mo.

4. The method of claim 1, wherein in step (2), an amount of the water is 30 parts by weigh to 150 parts by weight with respect to 100 parts by weight of the lithium composite transition metal oxide.

5. The method of claim 1, wherein the adding a weak acid is performed by adding phosphorous pentoxide ($P_2O_5$) powder, citric acid powder or a mixture thereof to the water containing the lithium composite transition metal oxide.

6. A method of preparing a positive electrode active material, comprising:
    (1) preparing a lithium composite transition metal oxide which comprises Ni, Co, and Mn, and an Ni content is 60 mol % or more;
    (2) putting the lithium composite transition metal oxide into water;
    (3) adding a weak acid to the water to decrease the pH to 7 to 10; and
    (4) forming a coating layer on a surface of the lithium composite transition metal oxide, wherein the weak acid is one or more selected from the group consisting of phosphorous pentoxide ($P_2O_5$), phosphoric acid, acetic acid, oxalic acid, citric acid, and boric acid.

* * * * *